US011200502B2

(12) United States Patent
Baughman et al.

(10) Patent No.: US 11,200,502 B2
(45) Date of Patent: Dec. 14, 2021

(54) STREAMING ATOMIC LINK LEARNING BASED ON SOCIALIZATION AND SYSTEM ACCURACY

(71) Applicant: INTERNATIONAL BUSINESS MACHINES CORPORATION, Armonk, NY (US)

(72) Inventors: Aaron K. Baughman, Silver Spring, MD (US); Stephen C. Hammer, Marietta, GA (US); Joseph S. Mabry, Fulton, GA (US); John C. Newell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 937 days.

(21) Appl. No.: 15/933,918

(22) Filed: Mar. 23, 2018

(65) Prior Publication Data
US 2019/0294985 A1    Sep. 26, 2019

(51) Int. Cl.
*G06N 20/00*    (2019.01)
*G06N 5/04*     (2006.01)
*G06N 3/08*     (2006.01)
*G06F 16/9535*  (2019.01)
*G06Q 50/00*    (2012.01)

(52) U.S. Cl.
CPC ......... *G06N 5/047* (2013.01); *G06F 16/9535* (2019.01); *G06N 3/08* (2013.01); *G06N 20/00* (2019.01); *G06Q 50/01* (2013.01)

(58) Field of Classification Search
None
See application file for complete search history.

(56) References Cited

U.S. PATENT DOCUMENTS

| 9,514,418 B2 | 12/2016 | Sanchez |
| 2009/0089078 A1 | 4/2009 | Bursey |
| 2013/0185670 A1 | 7/2013 | Liu et al. |

(Continued)

FOREIGN PATENT DOCUMENTS

| CN | 104954477 | 9/2015 |
| CN | 105005586 | 10/2015 |

OTHER PUBLICATIONS

Bischl et al., ASlib: A benchmark library for algorithm selection, 2016, Elsevier, pp. 41-58 (Year: 2016).*

(Continued)

*Primary Examiner* — David R Vincent
(74) *Attorney, Agent, or Firm* — Nicholas Bowman; Andrew D. Wright; Roberts Calderon Safran & Cole, P.C.

(57) ABSTRACT

Devices and methods for modeling streaming data are disclosed. A method includes: receiving, by a computing device, a local graph model; determining, by the computing device, a subgraph in the local graph model; acquiring, by the computing device, an external graph model; determining, by the computing device, a plurality of alternative subgraphs in the external graph model; determining, by the computing device, a score for each of the plurality of alternative subgraphs; selecting, by the computing device, an alternative subgraph having a highest score among the plurality of alternative subgraphs; and ensembling, by the computing device, the local graph model and the alternative subgraph having the highest score.

20 Claims, 6 Drawing Sheets

(56) References Cited

U.S. PATENT DOCUMENTS

| | | | |
|---|---|---|---|
| 2017/0242841 A1 | 8/2017 | Aravkin et al. | |
| 2017/0277753 A1 | 9/2017 | Kekre et al. | |
| 2018/0225391 A1* | 8/2018 | Sali | G06F 7/588 |
| 2018/0276508 A1* | 9/2018 | Crabtree | G06Q 10/063118 |
| 2018/0336487 A1* | 11/2018 | Moore | G06N 5/003 |
| 2019/0005407 A1* | 1/2019 | Harris | G06N 3/088 |
| 2019/0175100 A1* | 6/2019 | Etleb | A61B 5/015 |
| 2019/0346442 A1* | 11/2019 | Carr | G16B 40/10 |

OTHER PUBLICATIONS

Roy et al., "SocialTransfer: Cross-Domain Transfer Learning from Social Streams for Media Applications", Proceedings of the 20th ACM International Conference on Multimedia, Nara, Japan, Oct. 29-Nov. 2, 2012, 10 pages.

Pan et al., "Graph Stream Classification using Labeled and Unlabeled Graphs", 2013 IEEE 29th International Conference on Data Engineering (ICDE), 2013, 12 pages.

Mell et al., "The NIST Definition of Cloud Computing", NIST, Special Publication 800-145, Sep. 2011, 7 pages.

Albers et al., "Hierarchical event streams and event dependency graphs: a new computational model for embedded real-time systems", http://ieeexplore.ieee.org/document/1647729/, Jul. 5-7, 2006, 10 pages.

Hu et al., "Sparsity-Constrained fMRI Decoding of Visual Saliency in Naturalistic Video Streams", http://ieeexplore.ieee.org/document/7056490/, Mar. 9, 2015, 11 pages.

Ahmed et al., "Graph sample and hold: a framework for big-graph analytics", https://dl.acm.org/citation.cfm?id=2623757, Aug. 24-27, 2014, 10 pages.

Hannula et al. "On Independence Atoms and Keys", https://dl.acm.org/citation.cfm?id=2662058, Nov. 3-7, 2014, 18 pages.

\* cited by examiner

STREAMING ATOMIC LINK LEARNING BASED ON SOCIALIZATION AND SYSTEM ACCURACY

BACKGROUND

The present invention generally relates to computing devices and, more particularly, to a system and method for modeling streaming data.

In motion analytics, stream processing is used to analyze data on the fly. Various modeling techniques may be used in stream processing. As new data sources become available and the volume and veracity of data changes, new modeling techniques may be needed to effectively analyze the stream data. Additionally, as new deep learning techniques and algorithms are created and made available through marketplaces or shared code, modeling techniques may be improved such that the stream data may be more effectively analyzed.

SUMMARY

In a first aspect of the invention, there is a method that includes: receiving, by a computing device, a local graph model; determining, by the computing device, a subgraph in the local graph model; acquiring, by the computing device, an external graph model; determining, by the computing device, a plurality of alternative subgraphs in the external graph model; determining, by the computing device, a score for each of the plurality of alternative subgraphs; selecting, by the computing device, an alternative subgraph having a highest score among the plurality of alternative subgraphs; and ensembling, by the computing device, the local graph model and the alternative subgraph having the highest score.

In another aspect of the invention, there is a computer program product that includes a computer readable storage medium having program instructions embodied therewith. The program instructions are executable by a computing device to cause the computing device to: determine a plurality of subgraphs and data sources of a local graph model; acquire a plurality of complementary subgraphs from an external code repository; determine a score for each of the plurality of complementary subgraphs based upon reputational data; select at least one complementary subgraph from the plurality of complementary subgraphs based upon the determined score for each of the plurality of complementary subgraphs; and incorporate the selected at least one complementary subgraph into the local graph model.

In another aspect of the invention, there is a system that includes: a hardware processor, a computer readable memory, and a computer readable storage medium associated with a computing device; program instructions of a local graph model receiver configured to receive a local graph model; program instructions of a subgraph determiner configured to determine a subgraph in the local graph model received by the local graph model receiver; program instructions of an alternative subgraph acquirer configured to acquire an external graph model and determine a plurality of alternative subgraphs in the acquired external graph model; program instructions of an alternative subgraph scorer configured to determine a score for each of the plurality of alternative subgraphs determined by the alternative subgraph acquirer; and program instructions of an alternative subgraph ensembler configured to select an alternative subgraph having a highest score among the plurality of alternative subgraphs as determined by the alternative subgraph scorer and ensemble the local graph model and the selected alternative subgraph having the highest score. The program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
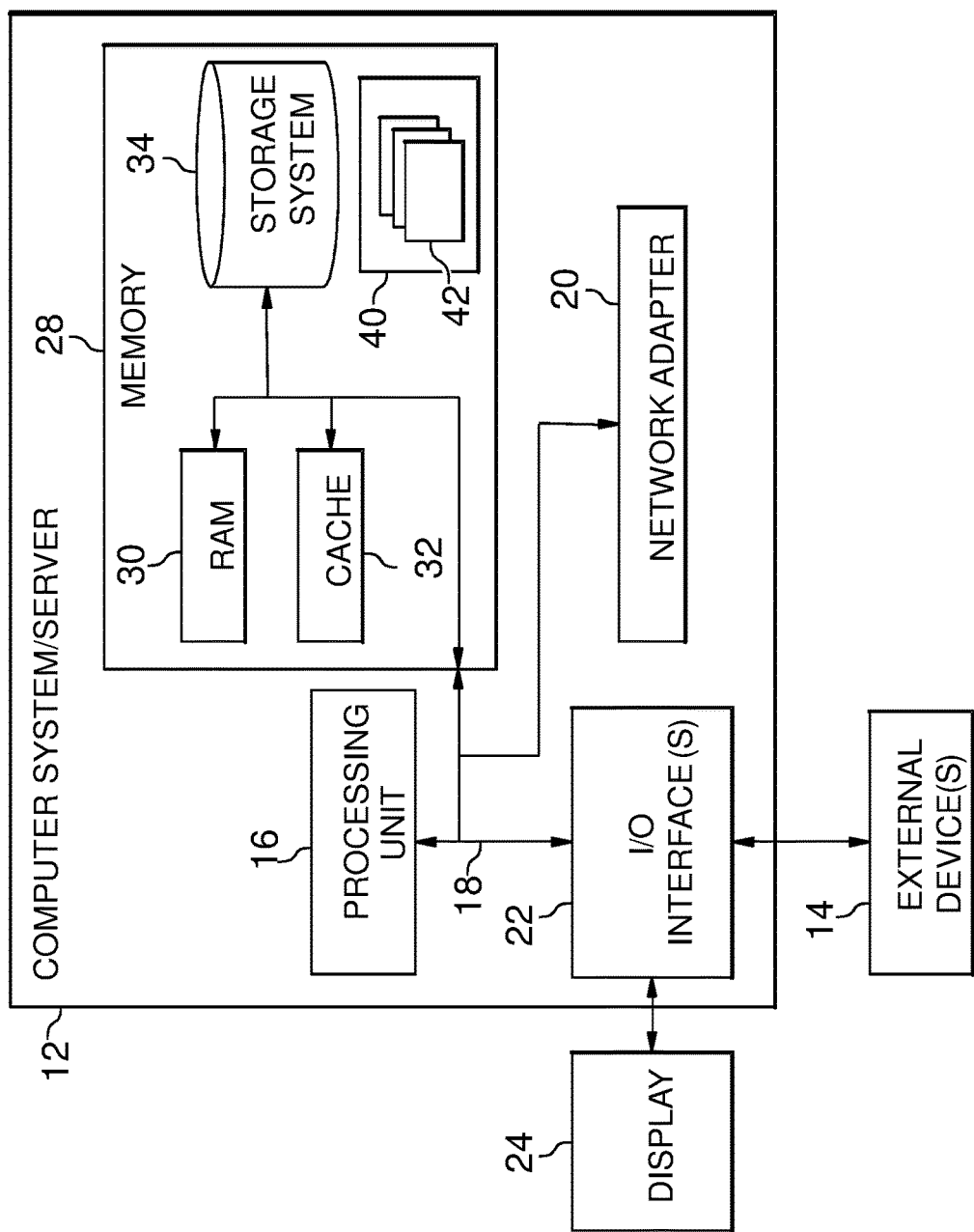
FIG. 1 depicts a cloud computing node in accordance with aspects of the invention.

The present invention generally relates to computing devices and, more particularly, to a system and method for modeling streaming data. Aspects of the invention are directed to improving streaming graph models in a stream computing environment using automated ensembling.

As described herein, aspects of the invention may include detecting and analyzing subgraphs and data sources of a graph model and identifying alternative/complementary subgraphs (e.g., algorithms) within crowdsourced locations (e.g., code libraries/repositories or social media websites). The graph model may be a regression model, a classification model, or any other type of model.

Additionally, as described herein, aspects of the invention may include evaluating the identified alternative/complementary subgraphs based on reputational data, selecting one or more of the alternative/complementary subgraphs based upon the evaluation, and incorporating the selected one or more alternative/complementary subgraphs into the graph model. Furthermore, as described herein, the incorporated one or more alternative/complementary subgraphs may be iteratively adjusted and tested to determine an impact to the accuracy of the graph model. Accordingly, the system may explore alternative graph edges for new modeling techniques as they emerge and become available in crowdsourced locations.

Other aspects of the invention are directed to extracting features of a local graph structure (e.g., algorithm types, fitness, sampling rates) and features of datasets utilized by the local graph structure (e.g., type, variability, etc.). As described herein, aspects of the invention may include discovering an additional subgraph in a social network library, extracting features of the additional subgraph and features of the datasets utilized by the additional subgraph, and using a neural network to measure the similarities between the extracted features of the local graph structure and the additional subgraph. Furthermore, as described herein, aspects of the invention may include, upon determining that the similarities exceed a certain threshold, ensembling the additional graph subgraph with the local graph structure.

New deep learning techniques and algorithms are created each week. These algorithms may become available through marketplaces or shared code. According to an embodiment, the streaming modeling system may find similar streaming graph models that address similar problems, and subgraphs from the similar streaming graph models may be injected into a current workspace. Machine learning about machine learning may be used to discover subgraphs to include into the streaming modeling workspace. Recommended subgraphs may be determined and evaluated based on system performance and model evaluation. Further, identical problems may be ensembled together.

According to an embodiment, the system may provide automatic subgraph social ensembling, automatic ensembling of complete graphs, automatic ensembling of social modeling streams, discovery of submodeling streams for inclusion into a modeling stream, socialization for modeling stream injection, machine learning about machine learning for subgraph streaming exploration, automatic discovery of new modeling and machine learning techniques, and crowd-sourced parameter selection in unfamiliar modeling algorithms. Additionally, according to an embodiment, the system may utilize measured social and feature vector correlation weights in ensembling, discover new algorithms to include into a modeling workspace, discover new data features to include into a modeling workspace, enable appropriate use of input parameters for modeling algorithms, reduce search time for new and improved modeling techniques, and learn the similarity of social network modeling streams.

Other aspects of the invention are directed to applying deep learning to features extracted from a local streaming modeling workspace. In particular, a long short term memory network (LSTM) may be used to learn features and to remember the gradient for changes made to the streaming modeling workspace. A sequence of features about the graph may be input the deeper one goes into the graph structure. Features may include algorithm type, fitness or objective function, sampling rate, regulation type, learning rate, training data size, feature size, topology summary, training process, and other features. In addition to features from the stream graph, a number of features may be computed from a sample of the dataset to determine variable distribution, type, correlation and mutual information with the outcome variable, and sampling methods.

According to an embodiment, a streaming modeling workspace from a social network may be discovered through search. A recurrent neural network may be used as the similar type features are fed into the network. The weights going forward may be remembered for the epoch of the remote streaming workspace. The two recurrent neural network (RNN) and LSTM outputs may be merged together and input into a fuzzy neural network (FNN) for similarity measure. If the similarity reaches a certain level, the workspaces may be ensembled together.

When ensembled, the weight may be determined by the similarity of social profiles as well as the Pearson correlation or mutual information of each feature. The models may be averaged together. The ensemble may be built over time with the addition of other social graphs. If the graph from the modeling stream is not similar enough, a subgraph is taken and input back into the algorithm. The algorithm may recurse through the graph structure for n number of times, ensembling parts or all of the graph together.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
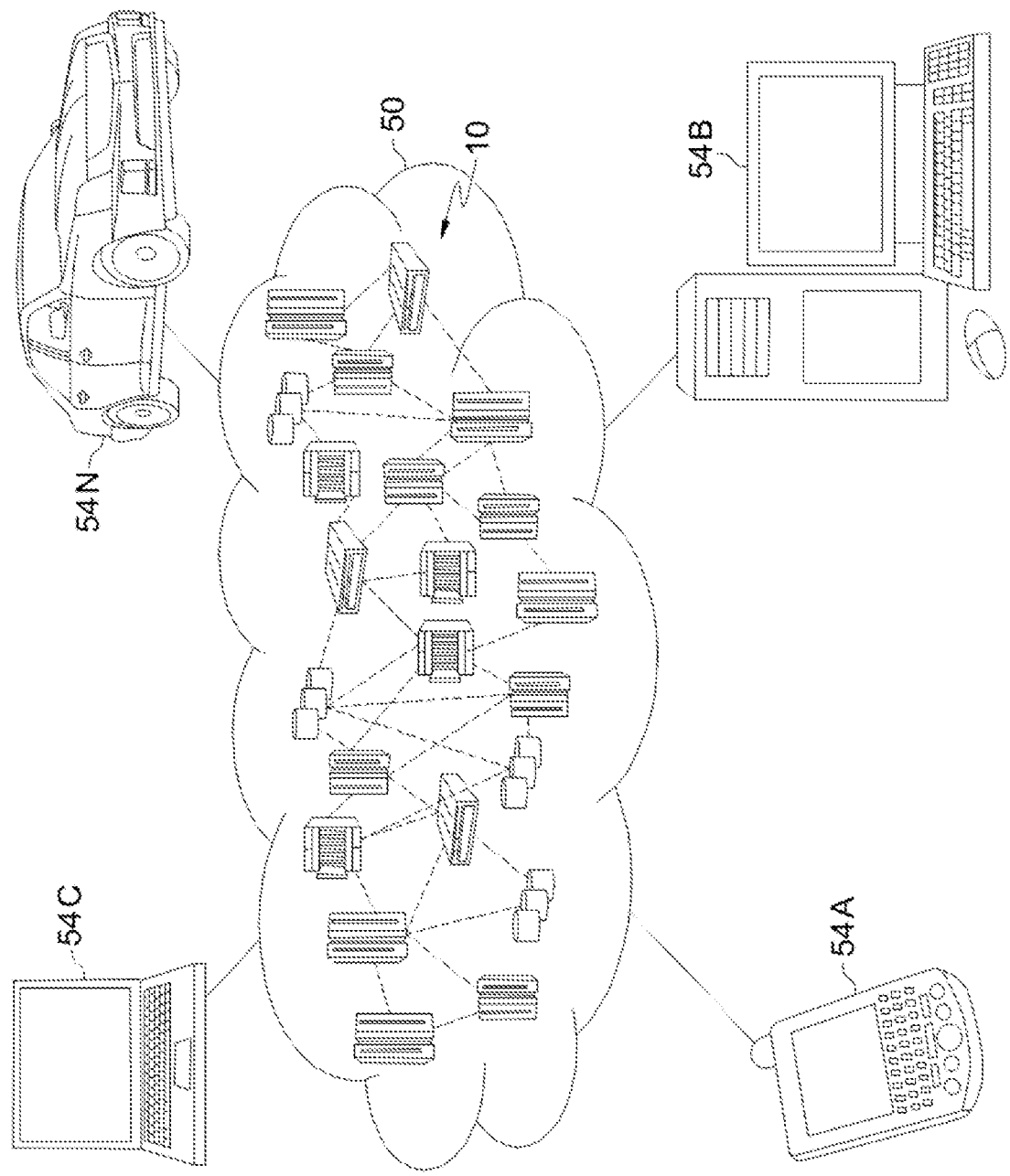
FIG. 2 depicts a cloud computing environment in accordance with aspects of the invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
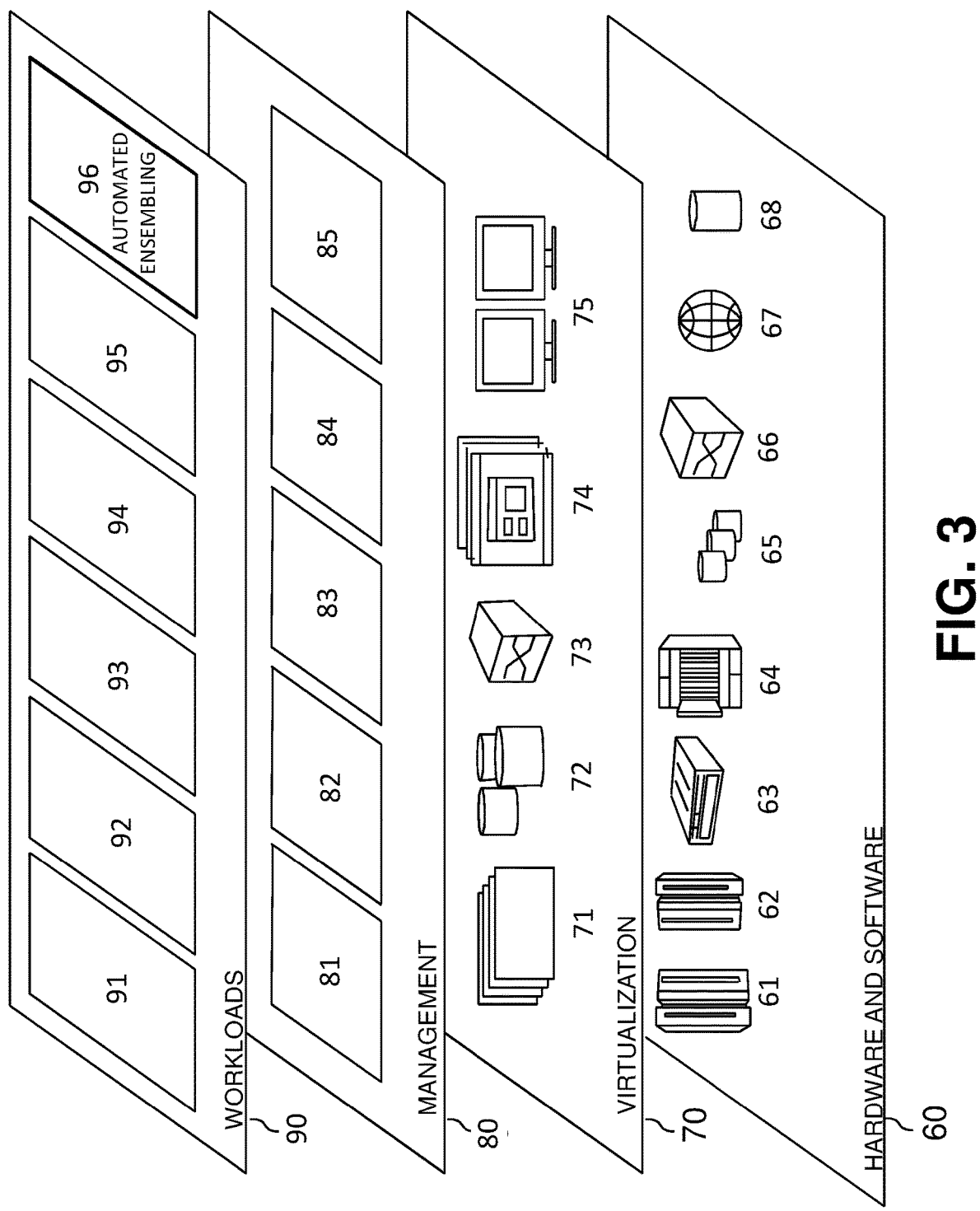
FIG. 3 depicts abstraction model layers in accordance with aspects of the invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated ensembling 96.

Referring back to FIG. 1, the program/utility 40 may include one or more program modules 42 that generally carry out the functions and/or methodologies of embodiments of the invention as described herein (e.g., such as the functionality provided by automated ensembling 96). Specifically, the program modules 42 may receive a local graph model, determine a subgraph in the local graph model, acquire an external graph model, determine a plurality of alternative subgraphs in the external graph model, determine a score for each of the plurality of alternative subgraphs, select an alternative subgraph having a highest score among the plurality of alternative subgraphs, and ensemble the local graph model and the alternative subgraph having the highest score. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of an automated ensembling program module 420 as shown in FIGS. 4 and 5.

Figure 4:
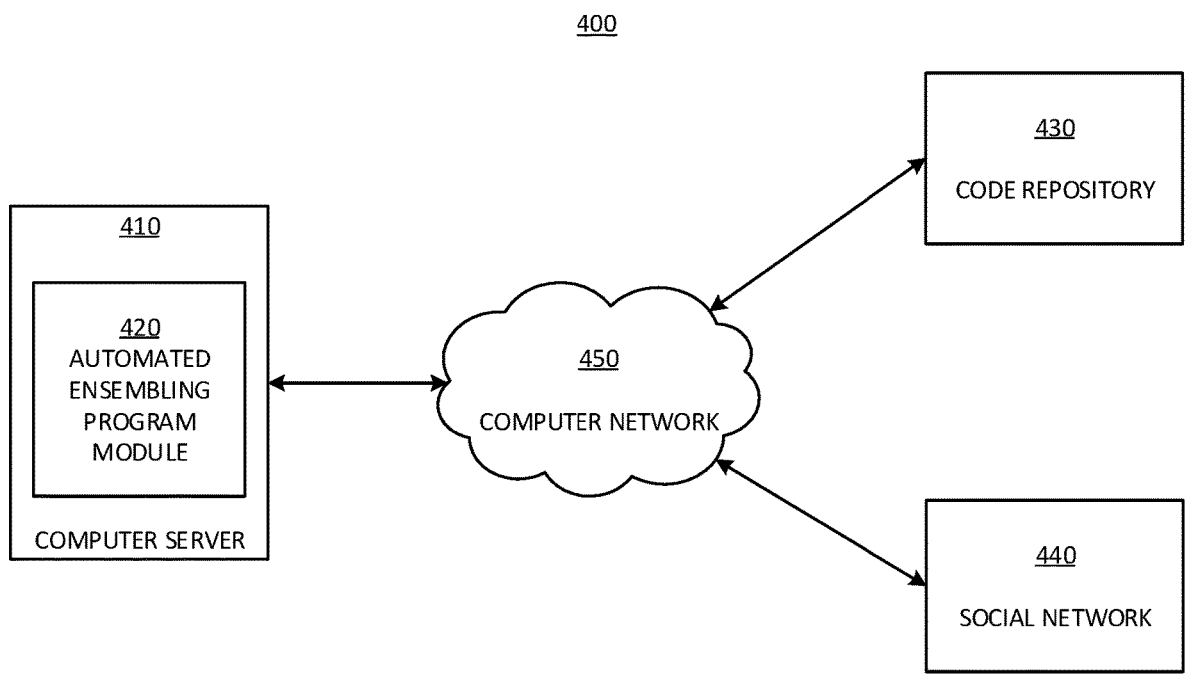
FIG. 4 depicts an illustrative environment in accordance with aspects of the invention.
Figure 5:
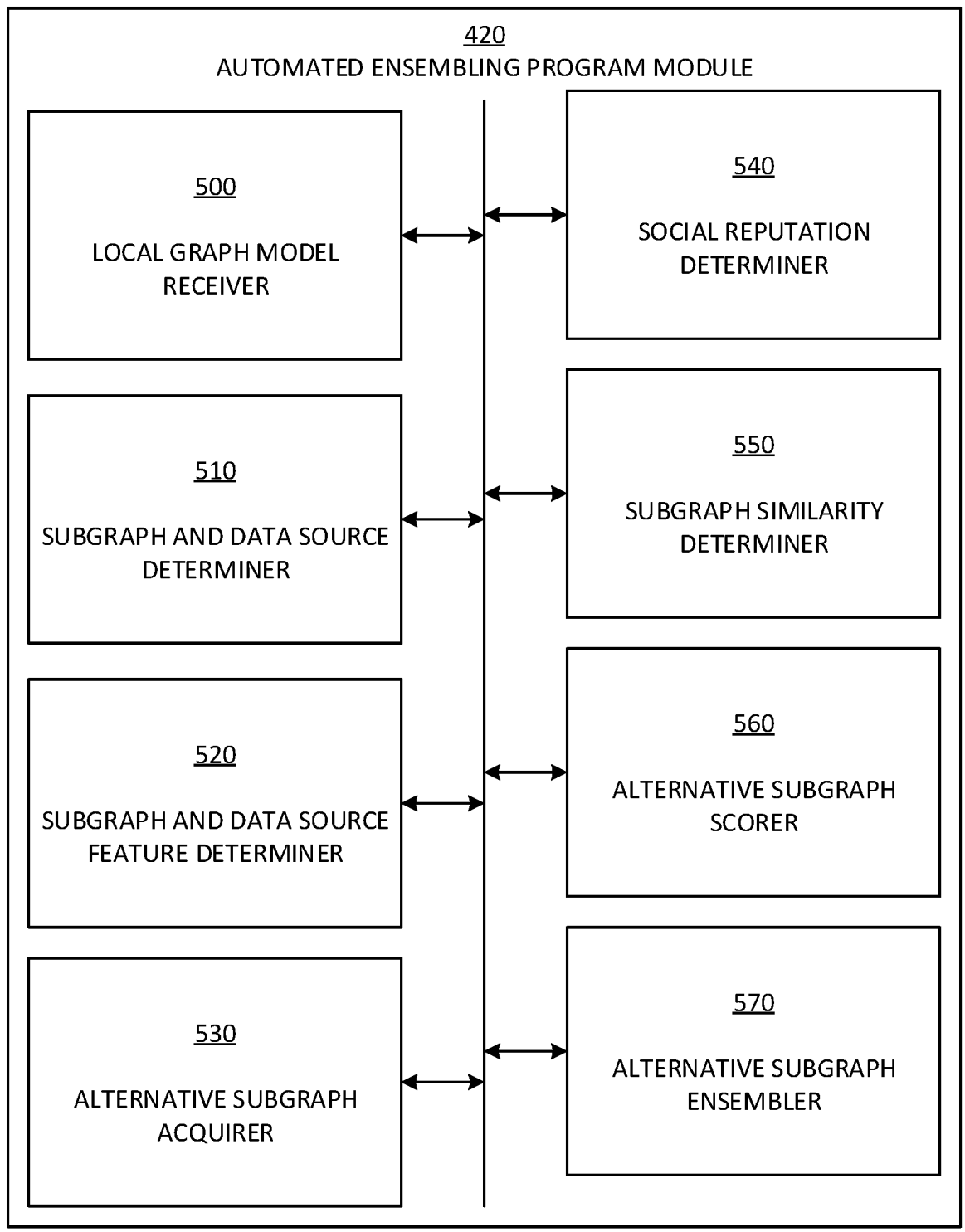
FIG. 5 depicts a block diagram of an exemplary program module in accordance with aspects of the invention.

FIG. 4 depicts an illustrative environment 400 in accordance with aspects of the invention. As shown, the environment 400 comprises a computer server 410 which is in communication with a code repository 430 and a social network 440 via a computer network 450. The computer network 450 may be any suitable communication network such as a LAN, WAN, or the Internet. The computer server 410, the code repository 430, and the social network 440 may be physically collocated, or may be situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the computer server 410 may be a server 12 shown in FIG. 1 and may be situated in the cloud computing environment 50 at one or more of the nodes 10 shown in FIG. 2. The computer server 410 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the computer server 410 may include an automated ensembling program module 420, which may include hardware and/or software and may be one or more of the program modules 42 shown in FIG. 1. According to an embodiment, the automated ensembling program module 420 includes program instructions for improving models in a stream computing environment using alternative subgraphs acquired from the code repository 430 and based upon reputational information from determined using the social network 440. The program instructions included in the automated ensembling program module 420 of the computer server 410 may be executed by one or more hardware processors.

According to an embodiment, the automated ensembling program module 420 performs functions related to detecting and analyzing subgraphs and data sources of a local graph model, identifying alternative/complementary subgraphs in external graph models within crowdsourced locations, evaluating the identified alternative/complementary subgraphs based on reputational data, selecting one or more of the alternative/complementary subgraphs based upon the evaluation, incorporating the selected one or more alternative/complementary subgraphs into the model, and iteratively adjusting the incorporated one or more alternative/complementary subgraphs. The automated ensembling program module 420 may also perform functions related to extracting features of a local graph structure and features of datasets utilized by the local graph structure, discovering an additional subgraph in a social network library, extracting features of the additional subgraph and features of the datasets utilized by the additional subgraph, using a neural network to measure the similarities between the extracted features of the local graph structure and the additional subgraph, and ensembling the additional graph subgraph with the local graph structure upon determining that the similarities exceed a certain threshold.

Still referring to FIG. 4, in embodiments, the code repository 430 may be a server 12 shown in FIG. 1. The code repository 430 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. The code repository 430 may be situated in the cloud computing environment 50 at one or more of the nodes 10 shown in FIG. 2, or the code repository 430 may be separate from the cloud computing environment 50.

According to an embodiment, the code repository 430 may store code for a plurality of external graph models, each of which having been created by one or more third parties (e.g., third party individuals, groups, teams, companies, academic institutions, etc.). The external graph models stored in the code repository 430 may include alternative/complementary subgraphs that may be incorporated into the local graph model by the automated ensembling program module 420.

Still referring to FIG. 4, in embodiments, the social network 440 may be a server 12 shown in FIG. 1. The social network 440 may be implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. The social network 440 may be situated in the cloud computing environment 50 at one or more of the nodes 10 shown in FIG. 2, or the social network 440 may be separate from the cloud computing environment 50.

According to an embodiment, the social network 440 may store reputational information and other information associated with each of the one or more third parties having code for external graph models stored in the code repository 430. The reputational information may include a reputation score or a reputation rank for each of the one or more third parties. The reputation score or reputation rank of a particular third party may be determined based upon peer evaluations of that third party, peer evaluations of code or graph models associated with that third party, a number of peers using code or graph models associated with that third party, or any other metrics for determining a reputation score or a reputation rank.

FIG. 5 shows a block diagram of an exemplary automated ensembling program module 420 in the server 410 (of FIG. 4) in accordance with aspects of the invention. In embodiments, the automated ensembling program module 420 includes a local graph model receiver 500, a subgraph and data source determiner 510, a subgraph and data source feature determiner 520, an alternative subgraph acquirer 530, a social reputation determiner 540, a subgraph similarity determiner 550, an alternative subgraph scorer 560, and an alternative subgraph ensembler 570, each of which may comprise one or more program modules 42 as described with respect to FIG. 1.

According to an alternative embodiment, one or more of the local graph model receiver 500, the subgraph and data source determiner 510, the subgraph and data source feature determiner 520, the alternative subgraph acquirer 530, the social reputation determiner 540, the subgraph similarity determiner 550, the alternative subgraph scorer 560, and the alternative subgraph ensembler 570 may be implemented in one or more separate computer servers 410 in one or more physical locations. In embodiments, the automated ensembling program module 420 may include additional or fewer components than those shown in FIG. 5. In embodiments, separate components may be integrated into a single computing component or module. Additionally, or alternatively, a single component may be implemented as multiple computing components or modules.

In embodiments, the local graph model receiver 500 receives a local streaming graph model. The local graph model receiver 500 may receive the local streaming graph model from a user, memory, a storage device, or another software module (e.g., a software module associated with a statistical software application). The local streaming graph model may be a graph that models relationships between data using analytics and data science methods. This local streaming graph model may be created using a modeling software application that manipulates and analyzes data in a stream. Alternatively, the local streaming graph model may be created using a programming language, such as R or Python.

In embodiments, the local graph model receiver 500, in response to receiving the local streaming graph model, may cause the subgraph and data source determiner 510 to identify or determine subgraphs that are present in the received local streaming graph model. For example, the subgraph and data source determiner 510 may identify, as subgraphs, subprocesses that make up a portion of the local streaming graph model. The subgraph and data source feature determiner 520 may use an automated machine learning method such as a deep learning model to determine and summarize the features of each of the subgraphs identified by the subgraph and data source determiner 510. The summary may include information about input and output variables (e.g., type, number, sampling rate, etc.), algorithm type, or any other information.

Additionally, in response to receiving the local streaming graph model, the local graph model receiver 500 may cause the subgraph and data source determiner 510 to identify or determine data sources associated with the received local streaming graph model. For example, the subgraph and data source determiner 510 may determine that data sources associated with the received local streaming graph model include input from sensors (e.g., measurements and time/date information corresponding to the measurements), weather data, or any other raw or processed data. The subgraph and data source feature determiner 520 may use an automated machine learning method such as a deep learning model to determine and summarize the features of each of the data sources identified by the subgraph and data source determiner 510. The summary may include information about the data sources (e.g., type, number, variability, etc.).

In embodiments, the alternative subgraph acquirer 530 may then identify alternative subgraph candidates. According to an embodiment, the alternative subgraph acquirer may acquire a plurality of external graph models stored in and/or provided by the code repository 430, cause the subgraph and data source determiner 510 to identify or determine subgraphs that are present in each of the plurality of external graph models, and determine a set of alternative subgraph candidates from the subgraphs identified by the subgraph and data source determiner 510 from the external graph models.

The alternative subgraph candidates may be determined based upon the summarized features as determined by the subgraph and data source feature determiner 520. The alternative subgraph acquirer 530 may determine the set of alternative subgraph candidates by selecting alternative subgraphs that optimize the output (e.g., minimize the error as determined using an accuracy metric such as a root mean squared error measurement) of the graph model. For example, the accuracy of a subgraph may be estimated based on an error in an original application of the subgraph, given a similarity of input features.

In embodiments, the social reputation determiner 540, for each of the alternative subgraph candidates in the set determined by the alternative subgraph acquirer 530, may then determine a reputation score or a reputation rank associated with the alternative subgraph candidate using the social network 440. According to an embodiment, the reputation score or reputation rank may be based on a reputation of each of one or more third parties that create, own, edit, and/or maintain the external graph model of which the alternative subgraph candidate is a part. For example, the third party associated with the alternative subgraph candidate may an individual, group, team, organization, company, academic institutions, or any other third party, and the reputation score or reputation rank associated with the third party associated with the alternative subgraph candidate may be provided by the social network 440.

According to another embodiment, the reputation score or reputation rank determined by the social reputation determiner 540 may be based on a reputation of the alternative subgraph candidate itself. For example, the reputation score or reputation rank may be based upon a rating of the alternative subgraph by individuals who have used and/or reviewed the alternative subgraph. According to yet another embodiment, the reputation score or reputation rank determined by the social reputation determiner 540 may be based on a frequency of use of the alterative subgraph candidate. For example, the reputation score or reputation rank may be based upon a number of individuals who have used the alternative subgraph and/or a number of external graph models into which the alternative subgraph has been incorporated. According to still another embodiment, the reputation score or reputation rank determined by the social reputation determiner 540 may determine the reputation score or reputation rank based on a combination of the above-mentioned reputation factors.

In embodiments, the subgraph and data source feature determiner 520 may then determine and summarize the features of each of the alternative subgraph candidates in the set and data sources associated therewith. For example, the subgraph and data source feature determiner 520 may use an automated machine learning method such as a deep learning model to determine and summarize the features of each of the alternative subgraph candidates in the set and the feature of the data sources associated therewith.

In embodiments, the subgraph similarity determiner 550 may then compare the summarized features of each of the alternative subgraph candidates in the set and data sources associated therewith with the summarized features of one or more subgraphs of the local streaming graph model identified by the subgraph and data source determiner 510 to determine, for each of the alternative subgraph candidates, a similarity score based on a level of similarity between the alternative subgraph candidate and one or more subgraphs of the local streaming graph model. For example, a comparatively higher similarity score may be determined by the subgraph similarity determiner 550 for a particular alternative subgraph candidate that is comparatively more similar to a particular subgraph of the local streaming graph model, and a comparatively lower similarity score may be determined by the subgraph similarity determiner 550 for a particular alternative subgraph candidate that is comparatively less similar to the particular subgraph of the local streaming graph model.

Next, for each of the alternative subgraph candidates in the set, the alternative subgraph scorer 560 may determine an overall score for the alternative subgraph candidate based upon the similarity score as determined by the subgraph similarity determiner 550 and the reputation score or reputation rank determined by the social reputation determiner 540. For example, a comparatively higher overall score may be determined by the alternative subgraph scorer 560 for a particular alternative subgraph candidate that has a comparatively higher similarity score and reputation score, and a comparatively lower similarity score may be determined by the alternative subgraph scorer 560 for a particular alternative subgraph candidate that has a comparatively lower similarity score and reputation score.

In determining the overall score for the alternative subgraph candidates, the alternative subgraph scorer 560 may assign the same weights to the similarity score determined by the subgraph similarity determiner 550 and the reputation score or reputation rank determined by the social reputation determiner 540. In another embodiment, in determining the overall score, the alternative subgraph scorer 560 may assign unequal weights to the similarity score and the reputation score.

According to an embodiment, the alternative subgraph scorer 560 may determine that the overall score for a particular alternative subgraph candidate is zero or is lowered by a predetermined amount or percentage if the similarity score determined by the subgraph similarity determiner 550 is below a predetermined minimum similarity score. Additionally, or instead, the alternative subgraph scorer 560 may determine that the overall score for a particular alternative subgraph candidate is zero or is lowered by a predetermined amount or percentage if the reputation score or reputation rank determined by the social reputation determiner 540 is below a predetermined minimum reputation score. In this manner, a particular alternative subgraph candidate may be excluded from the candidate set.

After the alternative subgraph scorer 560 determines an overall score for each of the alternative subgraph candidates in the set, the alternative subgraph scorer 560 may then select a highest scoring alternative subgraph candidate.

Next, the alternative subgraph ensembler 570 may update the local graph model received by the local graph model receiver 500 by ensembling. In particular, the alternative subgraph ensembler 570 may combine the highest scoring alternative subgraph candidate as determined by the alternative subgraph scorer 560 with the corresponding subgraph in the local graph model. In the ensembling, the alternative subgraph ensembler 570 may use a weight determined based upon: the overall score, as determined by the alternative subgraph scorer 560, for the highest scoring alternative subgraph candidate; an accuracy metric representing a level of improvement to results of the local graph model achieved by using the highest scoring alternative subgraph candidate; and/or information about a source of the highest scoring alternative subgraph candidate. According to an embodiment, an accuracy metric for a regression model may include a root mean squared error measurement. An accuracy metric for a classification model may be a percent accuracy. Alternatively, the alternative subgraph ensembler 570 may replace the subgraph in the local graph model with the highest scoring alternative subgraph candidate as determined by the alternative subgraph scorer 560.

In embodiments, after the alternative subgraph ensembler 570 combines the highest scoring alternative subgraph candidate as determined by the alternative subgraph scorer 560 with the corresponding subgraph in the local graph model, an evaluation is performed to determine an improvement to the local graph model. For example, a baseline accuracy measurement may be made prior to the ensembling by the alternative subgraph ensembler 570, and an updated accuracy measurement may be made after the ensembling by the alternative subgraph ensembler 570, and the two accuracy measurements may be compared to determine a change in accuracy. If the change in accuracy is negative, or is positive but does not exceed a predetermined minimum threshold, the system may revert to a version of the local graph model prior to the incorporation of the highest scoring alternative subgraph candidate by the alternative subgraph ensembler 570.

In embodiments, after the alternative subgraph ensembler 570 combines the highest scoring alternative subgraph candidate as determined by the alternative subgraph scorer 560 with the corresponding subgraph in the local graph model, additional alternative subgraphs may be combined with the local graph model in a similar manner. For example, for each of the subgraphs identified by the subgraph and data source determiner 510, a highest scoring alternative subgraph candidate as determined by the alternative subgraph scorer 560 may be the combined by the alternative subgraph ensembler 570 with the corresponding subgraph in the local graph model.

Figure 6:
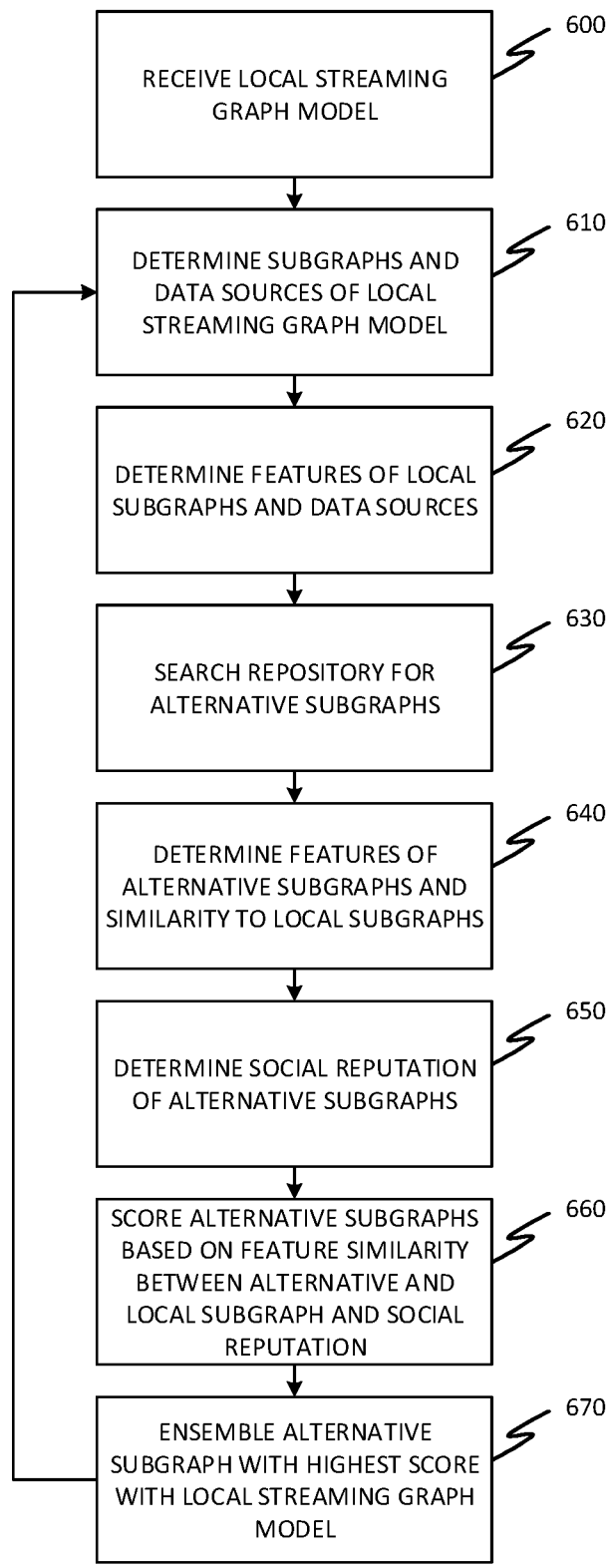
FIG. 6 depicts a flowchart of exemplary methods in accordance with aspects of the invention.

FIG. 6 depicts exemplary methods in accordance with aspects of the invention. The steps of the method may be performed in the environment of FIG. 4 and are described with reference to the elements and steps described with respect to FIGS. 1, 2, 4, and 5.

At step 600, the system receives a local streaming graph model. In embodiments, as described with respect to FIG. 5, step 600 comprises the local graph model receiver 500 receiving the local streaming graph model from a user, memory, a storage device, or another software module (e.g., a software module associated with a statistical software application).

At step 610, the system determines subgraphs and data sources that are present in the local streaming graph model received at step 600. In embodiments, as described with respect to FIG. 5, step 610 comprises the subgraph and data source determiner 510 identifying, as subgraphs, subprocesses that make up a portion of the local streaming graph model and identifying data sources associated therewith.

At step 620, the system determines features associated with the subgraphs and data sources determined in step 610. In embodiments, as described with respect to FIG. 5, step 620 comprises the subgraph and data source feature determiner 520 using an automated machine learning method such as a deep learning model (e.g., long short-term memory) to determine and summarize the features of each of the subgraphs and data sources identified by the subgraph and data source determiner 510.

At step 630, the system searches a repository for alternative subgraphs. In embodiments, as described with respect to FIG. 5, step 630 comprises the alternative subgraph acquirer acquiring a plurality of external graph models stored in and/or provided by the code repository 430, the subgraph and data source determiner 510 identifying or determining subgraphs that are present in each of the plurality of external graph models, and determining a set of alternative subgraph candidates from the subgraphs identified by the subgraph and data source determiner 510 from the external graph models.

At step 640, the system determines features associated with the alternative subgraphs identified in step 630 and a similarity to a subgraph of the local streaming graph model. In embodiments, as described with respect to FIG. 5, step 640 comprises the subgraph and data source feature determiner 520 using an automated machine learning method such as a deep learning model (e.g., long short-term memory) to determine and summarize the features of each of the alternative subgraph candidates in the set and data sources associated therewith and the subgraph similarity determiner 550 comparing the summarized features with those of a subgraph of the local streaming graph model to determine a similarity score based on a level of similarity between the alternative subgraph candidate and a subgraph of the local streaming graph model. The subgraph similarity determiner 550 may use a hierarchical feature merge and a feed forward neural network similarity measure in determining the similarity score.

At step 650, the system determines a social reputation of the alternative subgraphs. In embodiments, as described with respect to FIG. 5, step 650 comprises the social reputation determiner 540, for each of the alternative subgraph candidates in the set, determining a reputation score or a reputation rank associated with the alternative subgraph candidate using the social network 440.

At step 660, the system scores each of the alternative subgraphs based on the feature similarity between the alternative subgraph and a subgraph of the local streaming graph model as determined in step 640 and the social reputation of the alternative subgraph as determined in step 650. In embodiments, as described with respect to FIG. 5, step 660 comprises the alternative subgraph scorer 560 determining an overall score for the alternative subgraph candidate based upon the similarity score as determined by the subgraph similarity determiner 550 and the reputation score or reputation rank determined by the social reputation determiner 540.

At step 670, the system ensembles an alternative subgraph with the highest score as determined in step 660 with the local streaming graph model. In embodiments, as described with respect to FIG. 5, step 670 comprises the alternative subgraph ensembler 570 combining the highest scoring alternative subgraph candidate as determined by the alternative subgraph scorer 560 with the corresponding subgraph in the local graph model.

The system may test the updated graph model resulting from the ensembling to determine an impact to the accuracy of the graph model. If the ensembling does not result in an improvement to the accuracy of the graph model above a predetermined threshold, the system may discard the updated graph model and revert the graph model to the state existing prior to the ensembling. Next, flow may return to step 610, and the process of incorporating one or more alternative/complementary subgraphs may be repeated.

By way of an example, the local streaming graph model may be a model that predicts an outcome of a sporting event. In particular, the local streaming graph model may be a model that predicts a tennis player's chance of winning a tennis match. In this example, the model may be used to determine what a player needs to do in order to increase his or her chances of winning the tennis match. In particular, the model may be used to determine that the player needs to play more baseline shots or slow down his or her first serve. These rules are learned over time through the automatic subgraph social ensembling process described above. In particular, new sources of data and better algorithms are injected into the streaming modeling using the automatic subgraph social ensembling process, and the model may make more accurate predictions about what a player needs to do in order to increase his or her chances of winning a tennis match.

Embodiments of the invention improve the functioning of a computer by leveraging new sources of data and better algorithms retrieved from crowdsourced locations (e.g., code libraries/repositories or social media websites) to improve a graph model through ensembling. In particular, an accuracy of the graph model may be improved through an iterative process of incorporating one or more alternative/complementary subgraphs through ensembling and testing the updated graph model to determine an impact to the accuracy of the graph model. Accordingly, the functioning of the computer is improved through this process of exploring alternative graph edges for new modeling techniques as they emerge and become available in crowdsourced locations.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a computing device, a local graph model;
determining, by the computing device, a subgraph in the local graph model;
acquiring, by the computing device, an external graph model;
determining, by the computing device, a plurality of alternative subgraphs in the external graph model;
determining, by the computing device, a score for each of the plurality of alternative subgraphs;
selecting, by the computing device, an alternative subgraph having a highest score among the plurality of alternative subgraphs; and
ensembling, by the computing device, the local graph model and the alternative subgraph having the highest score.

2. The method according to claim 1, wherein the ensembling generates an updated local graph model, and
further comprising using the updated local graph model to determine player changes to improve a chance of winning a sporting event.

3. The method according to claim 1, further comprising determining, by the computing device, a plurality features of the subgraph.

4. The method according to claim 3, wherein the determining the plurality of features comprises using a deep learning model.

5. The method according to claim 3, further comprising, for each of the plurality of alternative subgraphs:
determining, by the computing device, a plurality of features of the alternative subgraph; and
determining, by the computing device, a similarity score based upon a similarity between the plurality of features of the subgraph and the plurality of features of the alternative subgraph.

6. The method according to claim 5, wherein the determining the score for each of the plurality of alternative subgraphs is based on the similarity score for the alternative subgraph.

7. The method according to claim 6, further comprising determining, by the computing device, a reputation score for each of the plurality of alternative subgraphs, and
wherein the determining the score for each of the plurality of alternative subgraphs is further based on the reputation score for the alternative subgraph.

8. The method according to claim 7, wherein the ensembling uses a weight determined based upon the score for the alternative subgraph having the highest score from a social vector weight correlation and a feature vector weight correlation.

9. The method according to claim 7, wherein the ensembling uses a weight determined based upon an accuracy metric representing a level of improvement to results of the local graph model by the alternative subgraph having the highest score.

10. A computer program product comprising a computer readable storage medium having program instructions embodied therewith, the program instructions executable by a computing device to cause the computing device to:
- determine a plurality of subgraphs and data sources of a local graph model;
- acquire a plurality of complementary subgraphs from an external code repository;
- determine a score for each of the plurality of complementary subgraphs based upon reputational data;
- select at least one complementary subgraph from the plurality of complementary subgraphs based upon the determined score for each of the plurality of complementary subgraphs; and
- incorporate the selected at least one complementary subgraph into the local graph model.

11. The computer program product according to claim 10, the program instructions further causing the computing device to determine a plurality of features of each of the plurality of subgraphs of the local graph model.

12. The computer program product according to claim 11, wherein each of the plurality of complementary subgraphs has a similarity score that is above a predetermined threshold.

13. The computer program product according to claim 12, wherein the similarity score is determined based upon a similarity between the plurality of features of one the plurality of subgraphs of the local graph model and the plurality of features of the complementary subgraph.

14. The computer program product according to claim 10, wherein the reputational data comprises a reputation score associated with a creator, owner, editor, or maintainer of the complementary subgraph.

15. The computer program product according to claim 14, wherein the reputational data is obtained from a social network; and
- the reputational data further comprises a reputation score based upon a rating of the complementary subgraph by individuals who have used the alternative subgraph.

16. The computer program product according to claim 10, wherein the incorporating the selected at least one complementary subgraph comprises using a weight determined based upon the score for the selected at least one complementary subgraph.

17. A system comprising:
- a hardware processor, a computer readable memory, and a computer readable storage medium associated with a computing device;
- program instructions of a local graph model receiver configured to receive a local graph model;
- program instructions of a subgraph determiner configured to determine a subgraph in the local graph model received by the local graph model receiver;
- program instructions of an alternative subgraph acquirer configured to acquire an external graph model and determine a plurality of alternative subgraphs in the acquired external graph model;
- program instructions of an alternative subgraph scorer configured to determine a score for each of the plurality of alternative subgraphs determined by the alternative subgraph acquirer; and
- program instructions of an alternative subgraph ensembler configured to select an alternative subgraph having a highest score among the plurality of alternative subgraphs as determined by the alternative subgraph scorer and ensemble the local graph model and the selected alternative subgraph having the highest score,
- wherein the program instructions are stored on the computer readable storage medium for execution by the hardware processor via the computer readable memory.

18. The system according to claim 17, wherein the subgraph determiner is further configured to determine a plurality of features of the subgraph.

19. The system according to claim 18, wherein the alternative subgraph acquirer is further configured to determine, for each of the plurality of alternative subgraphs:
- a plurality of features of the alternative subgraph, and
- a similarity score for the alternative subgraph based upon a similarity between the plurality of features of the subgraph and the plurality of features of the alternative subgraph.

20. The system according to claim 19, wherein the alternative subgraph scorer is further configured to determine the score for each of the plurality of alternative subgraphs based on the similarity score for the alternative subgraph as determined by the alternative subgraph acquirer.

* * * * *